(12) United States Patent
Sun et al.

(10) Patent No.: US 9,491,640 B2
(45) Date of Patent: Nov. 8, 2016

(54) METHOD AND SYSTEM FOR SWITCHING WORKING MODE FOR BACKWARD COMPATIBLE BROADBAND WIRELESS NETWORK

(75) Inventors: Bo Sun, Shenzhen (CN); Kaiying Lv, Shenzhen (CN); Nan Li, Shenzhen (CN); Feng Li, Shenzhen (CN); Li Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 426 days.

(21) Appl. No.: 13/883,092

(22) PCT Filed: Sep. 30, 2011

(86) PCT No.: PCT/CN2011/080478
§ 371 (c)(1),
(2), (4) Date: Jul. 1, 2013

(87) PCT Pub. No.: WO2012/058996
PCT Pub. Date: May 10, 2012

(65) Prior Publication Data
US 2013/0286891 A1    Oct. 31, 2013

(30) Foreign Application Priority Data
Nov. 2, 2010 (CN) .......................... 2010 1 0529964

(51) Int. Cl.
*H04L 12/28* (2006.01)
*H04W 24/02* (2009.01)
*H04W 36/06* (2009.01)

(52) U.S. Cl.
CPC ............. *H04W 24/02* (2013.01); *H04W 36/06* (2013.01)

(58) Field of Classification Search
None
See application file for complete search history.

(56) References Cited

U.S. PATENT DOCUMENTS

| 7,352,728 B2 | 4/2008 | Soomro |
| 7,486,616 B2 | 2/2009 | Kitchin |

(Continued)

FOREIGN PATENT DOCUMENTS

| CN | 1640062 A | 7/2005 |
| CN | 1890927 A | 1/2007 |

(Continued)

OTHER PUBLICATIONS

International Search Report in international application No. PCT/CN2011/080478, mailed on Jan. 5, 2012.

(Continued)

*Primary Examiner* — Afshawn Towfighi
(74) *Attorney, Agent, or Firm* — Oppedahl Patent Law Firm LLC

(57) ABSTRACT

The disclosure discloses a method and a system for switching a working mode for a backward compatible broadband wireless network, in order to solve the technical problem of switching between each working mode when various compatible modes based on different channelized sets exist in the broadband wireless network. In the disclosure, an access point (AP) indicates its current working mode by a system configuration message; the AP instructs a non-AP associated with the AP to switch a working mode by a mode switching message or a frame exchange sequence; and the non-AP switches the working mode according to instruction information included in the mode switching message or the frame exchange sequence after receiving the mode switching message or the frame exchange sequence. Through the scheme of the disclosure, a wireless point can be switched between each working mode when various compatible modes based on different channelized sets exist in the broadband wireless network, thereby setting up a broadband wireless network supporting backward compatibility.

13 Claims, 2 Drawing Sheets

(56) References Cited

U.S. PATENT DOCUMENTS

| | | |
|---|---|---|
| 2003/0171116 A1 | 9/2003 | Soomro |
| 2005/0128982 A1* | 6/2005 | Kitchin .................... 370/332 |
| 2005/0185669 A1* | 8/2005 | Welborn et al. ............ 370/465 |
| 2005/0265295 A1* | 12/2005 | Ishizuka ................... 370/336 |
| 2006/0029024 A1 | 2/2006 | Zeng et al. |
| 2006/0077933 A1 | 4/2006 | Coupechoux |
| 2008/0298443 A1* | 12/2008 | Deng ................... H04W 28/06 375/220 |
| 2010/0248630 A1* | 9/2010 | Abraham et al. ............. 455/59 |
| 2013/0003679 A1* | 1/2013 | Seok et al. ................. 370/329 |

FOREIGN PATENT DOCUMENTS

| | | |
|---|---|---|
| CN | 101036061 A | 9/2007 |
| CN | 101547527 A | 9/2009 |

OTHER PUBLICATIONS

English Translation of the Written Opinion of the International Search Authority in international application No. PCT/CN2011/080478, mailed on Jan. 5, 2012.

\* cited by examiner

METHOD AND SYSTEM FOR SWITCHING WORKING MODE FOR BACKWARD COMPATIBLE BROADBAND WIRELESS NETWORK

TECHNICAL FIELD

The disclosure relates to the field of wireless communications, in particular to a method and a system for switching a working mode for a backward compatible broadband wireless network.

BACKGROUND

At present, with the rapid development of Wireless Local Area Network (WLAN), the demand for the coverage of the WLAN is growing in the field of wireless networks. The most common WLAN technologies for a series of standards, such as 802.11a, 802.11b and 802.11g are defined in the Institute of Electrical and Electronic Engineers (IEEE) 802.11 group; since then, other task groups appear successively to devote to the development of the specification referring to the improvement of conventional 802.11 technology, for example, the 802.11n task group sets a High Throughput (HT) requirement and supports a data rate as high as 600 Mbps; and the 802.11ac task group further puts forward the concept of Very High Throughput (VHT) to increase the data rate to 1 Gbps. A new protocol needs to be backward compatible with the previous protocols.

In 802.11, an Access Point (AP) and a plurality of non-APs associated with the AP make up a Basic Service Set (BSS), as shown in FIG. 1. The WLAN defined by IEEE802.11 uses the Carrier Sense Multiple Access (CSMA) mechanism with Collision Avoidance (CA) to enable multiple points to share a wireless channel.

In IEEE802.11 technology, a channelized set refers to a set consisting of multiple channels of 20 MHz defined from a predefined or fixed start frequency and multiple broadband channels consisting of these channels of 20 MHz in a given frequency band. These channels of 20 MHz making up the set are also called basic channels and other channels consisting of these basic channels are also called broadband channels. A broadband channel includes a basic channel called a main channel, which is used for broadcasting control information. In a channelized set, each basic channel has a unique channel number.

In the description of the disclosure, available channels refer to a group of non-overlapped basic channels defined in a channelized set or the set of these basic channels; and a working channel refers to an available channel being used or to be used by a wireless device.

In the technology defined by a series of standards of IEEE802.11, a license-free ISM frequency band is channelized into multiple channels of 20 MHz according to the basic channel bandwidth of 20 MHz. An interval of 5 MHz exists between adjacent channel center frequencies; and the channels are numbered according to a given or predefined start frequency. Multiple channels defined above are taken as working channels in IEEE802.11. For example, in a frequency band of 2.4 GHz, fourteen adjacent channels of 20 MHz are defined in IEEE802.11 to serve as available channels; and these available channels and their adjacent available channel have a 5 MHz interval in terms of center frequency, and are overlapped with one another. For another example, in a frequency band of 5 GHz, five channels of 20 MHz between 5.735 GHz and 5.835 GHz are defined in IEEE802.11 to serve as available channels; and these available channels and their adjacent available channel have a 20 MHz interval in terms of center frequency and are not overlapped with one another.

In some cases, the frequency planning of some countries cannot be fully utilized under the definition of channelization. For example, in a frequency band of 5 GHz in China, a frequency band of 125 MHz in total between 5.725 GHz to 5.850 GHz can be used for the WLAN, and the frequency band can be divided into six available channels of 20 MHz, or a signal of 120 MHz bandwidth can be defined by a more effective channelization scheme. Whereas, a problem of center frequency deviation exists between the more effective channelization scheme and the conventional 5 GHz channelization scheme, so that the WLAN equipment cannot perform simple expansion processing on the efficient channelization scheme according to the conventional channelization scheme; and particularly, devices cannot communicate with each other in the conventional way when working in a WLAN according to different channelization schemes. In such case, multiple working modes may coexist, wherein the working mode refers to that a data transmission signal is transmitted by a channel defined by a channelized set and a corresponding bandwidth, or a frame exchange sequence is transmitted by a channel defined by one or more channelized sets and a corresponding bandwidth. The frame exchange sequence refers to the sending of a series of wireless frames and corresponding wireless frame feedback required to complete one data transmission. For example, generally, a transmitted data frame may follow an acknowledgement frame from a receiver; and before a long data frame is sent, a receiver and a sender may exchange two short wireless frames to reserve a channel to send the data frame subsequently.

Therefore, how to design a more effective channelization scheme compatible with the conventional channelization scheme and provide a method for switching between different working modes is a problem to be solved in a new generation of broadband-based 802.11 protocol.

SUMMARY

In view of this, the main objective of the disclosure is to provide a method and a system for switching a working mode for a backward compatible broadband wireless network, in order to solve the technical problem of switching between each working mode when various compatible modes based on different channelized sets exist in a broadband wireless network.

To achieve the objective above, the technical scheme of the disclosure is implemented as follows.

A method for mode switching for a backward compatible broadband wireless network includes:

an AP indicates its current working mode by a system configuration message;

the AP instructs a non-AP associated with the AP to switch a working mode by a mode switching message or a frame exchange sequence; and the non-AP switches the working mode according to instruction information included in the mode switching message or the frame exchange sequence after receiving the mode switching message or the frame exchange sequence.

Preferably, the process that the AP instructs a non-AP associated with the AP to switch a working mode may include:

the AP in working mode 1 sends a mode switching message to the non-AP associated with the AP, wherein the mode switching message is used for instructing the non-AP associated with the AP that the AP will be switched to working mode 2 within a specified switching time; and the AP is switched to a specified working mode within the specified switching time, and the non-AP associated with the AP is switched to working mode 2 within a specified switching time after receiving the mode switching message, wherein the working mode 1 is a first or second working mode, and correspondingly, the working mode 2 is a second or first working mode.

Preferably, the process that the AP instructs a non-AP associated with the AP to switch a working mode may include:

the AP sends mode switching message 1 in working mode 1, wherein the mode switching message 1 is used for instructing the non-AP associated with the AP that the AP will be switched to working mode 2 within a specified switching time;

the non-AP associated with the AP is switched to working mode 2 within a specified time according to the instruction after receiving the mode switching message 1;

the AP, after completing a transmission task on a channel in working mode 2, sends mode switching message 2 on the channel in working mode 2 to instruct the non-AP associated with the AP that the AP will be switched back to working mode 1 within a specified time; and the non-AP associated with the AP is switched to working mode 1 within a specified time according to the instruction after receiving the mode switching message 2, wherein the working mode 1 is a first or second working mode, and correspondingly, the working mode 2 is a second or first working mode.

Preferably, the process that the AP instructs a non-AP associated with the AP to switch a working mode may include:

the AP in working mode 1 instructs the non-AP associated with the AP through a frame exchange sequence that data should be sent in working mode 2 subsequently and notifies by the frame exchange sequence a maximum duration for sending data in working mode 2 to the non-AP associated with the AP;

the AP and the non-AP are switched to working mode 2 to transmit data within a specified time according to the instruction after completing triggering of the frame exchange sequence for mode switching; and the AP and the non-AP are switched back to working mode 1 at once after completing data transmission in working mode 2, wherein the working mode 1 is a first or second working mode, and correspondingly, the working mode 2 is a second or first working mode.

Furthermore, the non-AP in working mode 1 may instruct the AP through a frame exchange sequence that data will be sent in working mode 2 subsequently and notifies through the frame exchange sequence a maximum duration for sending data in working mode 2 to the AP;

the non-AP and the AP are switched to working mode 2 to transmit data within a specified time according to the instruction after completing triggering of the frame exchange sequence for mode switching; and the non-AP and the AP are switched back to working mode 1 at once after completing data transmission in working mode 2.

Preferably, the process that the AP instructs a non-AP associated with the AP to switch a working mode may include:

the AP sends a system configuration message in first and second working modes independently and respectively, and further indicates time division for Medium Access Control (MAC) in each working mode respectively; and the non-AP interacts with the AP at a point competition part and accesses a network on a channel corresponding to the first or second working mode according to a time zone which is divided for the MAC in each working mode and indicated by the system configuration message that is broadcast in the first or second working mode, and the non-AP further transmits data in a corresponding working mode.

Preferably, the non-AP may keep silence in its original working mode when not supporting a working mode to be switched to.

Preferably, the system configuration message indicating a current working mode may include one or more of the following: working mode indication, channel indication, bandwidth indication, national area code indication and channel planning indication.

Based on the method, the disclosure further discloses a system for mode switching for a backward compatible broadband wireless network to implement the method. The system includes an AP and a non-AP, the functions of which refer to what is described in the flow of the method and the embodiments.

Through the scheme of the disclosure, a wireless point can be switched between each working mode when various compatible modes based on different channelized sets exist in a broadband wireless network, thereby setting up a broadband wireless network supporting backward compatibility. Other features and advantages of the disclosure will be explained in the following description, and partially clear from the description or understood through the implementation of the disclosure. The objectives and other advantages of the disclosure can be implemented and obtained through the structures particularly specified in the description, claims and drawings herein.

DETAILED DESCRIPTION

The preferred embodiments of the disclosure are described below with reference to the drawings, and it should be understood that the preferred embodiments herein are intended to describe and explain the disclosure instead of limiting the disclosure. In the case of no conflict, the embodiments of the application and features therein can be combined with each other. In the embodiments of the disclosure, the channel bandwidths referred herein include channel bandwidths of 20 MHz, 40 MHz, 80 MHz, 120 MHz and 160 MHz and other larger channel bandwidths with 20 MHz as a unit.

Figure 1:
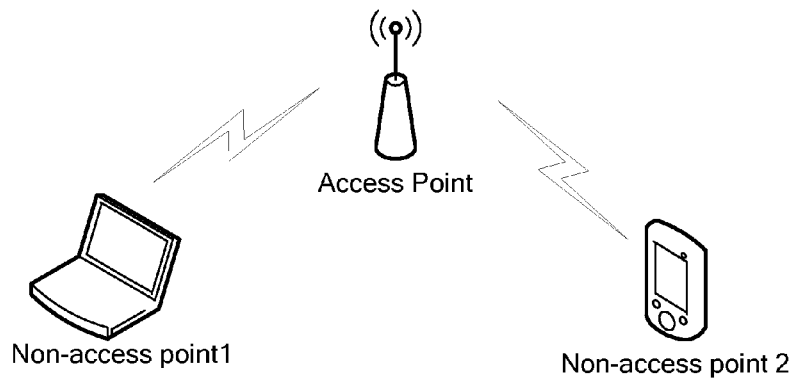
FIG. 1 is a diagram showing the structure of a basic service set.
Figure 2:
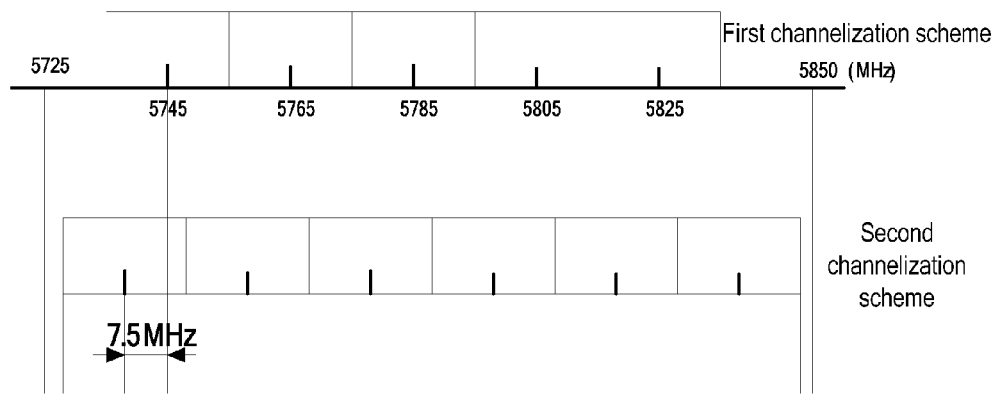
FIG. 2 is a diagram showing the scheme of a first channelized set and a second channelized set.

A frequency band of 5.725 GHz to 5.850 GHz is described in the following embodiments as an example. A first channelized set corresponding to a first channelization scheme includes five basic channels of 20 MHz which take 5 GHz as a start frequency and are defined in the frequency band of 5.735 GHz to 5.835 GHz and conforming to the conventional IEEE802.11 specification, and two channels of 40 MHz and 80 MHz consisting of the basic channels. A second channelized set corresponding to a second channelization scheme includes six basic channels of 20 MHz taking 4.9925 GHz as a start frequency and defined in the frequency band of 5.725 GHz to 5.850 GHz and three channels of 40 MHz, one or two channels of 80 MHz and one channel of 120 MHz consisting of the basic channels, as shown in FIG. 2.

In the following embodiments, the following working modes are defined, but it should be noted that what described in the disclosure is not limited to the following two working modes.

A first working mode refers to one in which an AP works on a channel in the first channelized set, i.e., a traditional working mode.

A second working mode refers to one in which an AP works on a channel in the second channelized set, i.e., an enhanced working mode.

The two working modes can coexist and are switchable.

The AP works on the channels in the first and second channelized sets alternately in terms of time, but only sends a system configuration message and completes the accessing process of a non-AP on the channel in the first or second channelized set, i.e., in a mixed working mode.

The AP works on the channels in the first and second channelized sets alternately in terms of time, and can send a system configuration message and complete the accessing process of the non-AP on the channels in the first and second channelized sets, i.e., in a dual-mode working mode.

First Embodiment

Figure 3:
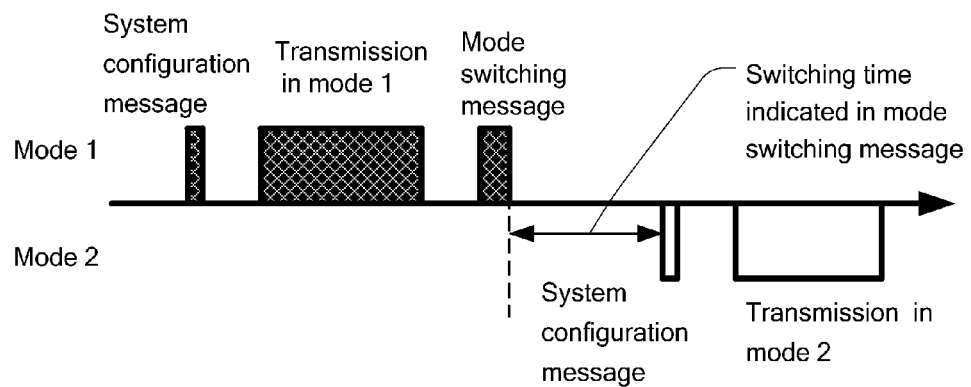
FIG. 3 is a diagram showing a mode switching process in the first embodiment of the disclosure.

FIG. 3 is a diagram showing a channel switching process in the embodiment, and the application scenario of the embodiment is that an AP instructs a non-AP to switch from the first working mode to the second working mode at a time. In the embodiment, the AP supports the first and second working modes and works in the first working mode currently; and when the AP detects that the non-AP associated with the AP can support the second working mode currently or it is necessary to switch from the first working mode to the second working mode due to some reasons, switching is executed as follows:

Step 1: The AP indicates that it works on a channel in the first working mode currently by working channel and channel planning information in a transmitted system configuration message, such as a beacon frame.

Step 2: When the switching condition is met, for example, all the non-APs support the second working mode or the channel disturbance in the first working mode is too large now, the AP sends a mode switching message on the channel in the first working mode, such as including the channel switching information of the second channelized set, to an associated non-AP to instruct it that the AP will be switched to the channel in the second working mode within the specified time.

Step 3: The AP is switched to the channel in the second working mode within the switching time indicated by the mode switching message, and sends a system configuration message on the channel in the second working mode, such as a beacon frame, to establish a transmission environment.

Step 4: The non-AP is switched to the specified channel in the second working mode within the indicated switching time to start working after receiving the mode switching message.

Step 5: If the non-AP does not support the second channelized set, the non-AP stops the association with the AP within the specified time.

The process above is the switching from the first working mode to the second working mode, and the process of switching from the second working mode to the first working mode is similar to the process above, thereby needing no further description.

Second Embodiment

Figure 4:
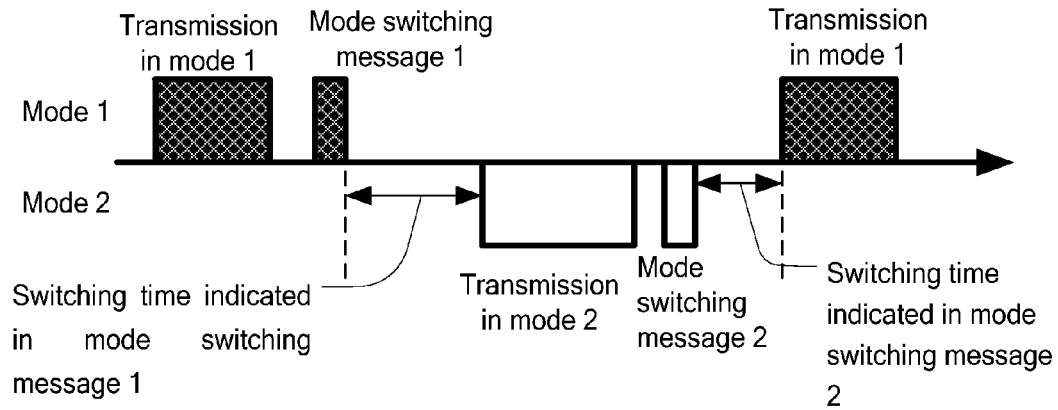
FIG. 4 is a diagram showing a mode switching process in the second embodiment of the disclosure.

FIG. 4 is a diagram showing a channel switching process of the embodiment; and the application scenario of the embodiment is that an AP works in working mode 1 and instructs a non-AP to switch from working mode 1 to working mode 2 temporarily and then switch back to working mode 1, wherein working mode 1 is a first or second working mode defined in the disclosure, and correspondingly, working mode 2 is a second or first working mode defined in the disclosure. In the embodiment, the AP supports the first and second working modes, and the non-AP supports the first and second working modes or only supports the first working mode. The switching process is as follows:

Step 1: The AP indicates that it supports working on the channel in the first and/or second working mode and the corresponding bandwidth in a transmitted system configuration message, such as a beacon frame.

Step 2: When working in working mode 1, the AP sends mode switching message 1 to instruct the non-AP associated with the AP that the AP will be switched to working mode 2 within the switching time specified in mode switching message 1.

The mode switching message can be one or more messages, or various messages, for example, a mode switching message or a phased coexistence operation management frame is used for instructing the non-AP associated with the AP to switch a working mode, and another control frame, such as CTS-TO-SELF, is used for notifying the working duration in working mode 2.

Step 3: The non-AP associated with the AP is switched to working mode 2 to work within the specified time according to the instruction after receiving the mode switching message if the non-AP supports working mode 2; and the non-AP associated with the AP continues to work in working mode 1 but keeps silence within the specified time, i.e., not sending a wireless frame, after receiving the mode switching message if the non-AP does not support working mode 2.

Step 4: The AP, after completing a transmission task on the channel in working mode 2, sends mode switching message 2 or a signal on the channel in working mode 2 to instruct the associated non-AP that the AP will be switched back to working mode 1 within the specified time or at once.

The mode switching message 2 or the signal can be one or more messages or signals or various messages or signals, for example, one message or signal is used for instructing the working mode switching, and another message or signal is used for notifying the working duration in working mode 1.

Step 5: The non-AP which is switched to working mode 2 according to mode switching message 1 in Step 3, is switched to working mode 1 to work within the specified time according to the instruction of mode switching message 2 after receiving mode switching message 2 sent in Step 4.

Step 6: If the non-AP associated with the AP does not support working mode 2, the non-AP associated with the AP keeps silence and does not send a wireless frame within the time indicated by the mode switching message sent in Step 3 unless the AP sends another message to it on the channel in working mode 1 to allow it to send the wireless frame or the working time in working mode 2 indicated in mode switching message 1 is over.

Third Embodiment

Figure 5:
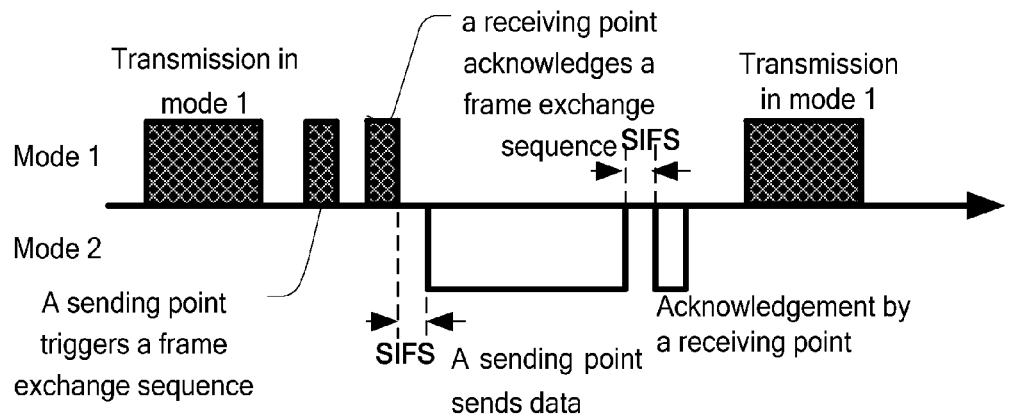
FIG. 5 is a diagram showing a mode switching process in the third embodiment of the disclosure.

FIG. 5 is a diagram showing a channel switching process in the embodiment; and the application scenario of the embodiment is that a sending point (which can be an AP or a non-AP associated with the AP) and a receiving point (which can be an AP or a non-AP associated with the AP) work in working mode 1, and the sending point notifies the receiving point to temporarily switch to working mode 2 to transmit data and then switch back to working mode 1 by triggering a frame exchange sequence instructing the mode switching, wherein working mode 1 is a first or second working mode defined in the disclosure, and correspondingly, second working mode 2 is a second or first working mode defined in the disclosure. Both the sending point and the receiving point in the embodiment support the first and second working modes, and the switching process is as follows:

Step 1: The AP indicates that it supports working on the channels in the first and second working modes and the corresponding bandwidth in a transmitted system configuration message, such as a beacon frame.

Step 2: When the sending point works in working mode 1 and will be switched to working mode 2 to send data, it notifies the receiving point by triggering a frame exchange sequence that data will be sent in working mode 2 subsequently and notifies the receiving point of the maximum duration of data transmission in working mode 2 through the frame exchange sequence. The frame exchange sequence includes a wireless frame in working mode 1 and an acknowledgement of the wireless frame.

Step 3: After completing triggering the frame exchange sequence for the mode switching, the sending point and the receiving point are switched to working mode 2 at once and transmit data after a specified Short Inter-Frame Spacing (SIFS). The transmission of the data includes the sending of data and acknowledgement. The data is sent in working mode 2, while the acknowledgement of the sending of the data is performed in working mode 1 or working mode 2.

Step 4: The sending point and the receiving point are switched back to working mode 1 at once after completing the data transmission in working mode 2.

Or, the sending point is switched back to working mode 1 at once to wait to receive the acknowledgement of the sending of the data after completing sending data on the channel in working mode 2; and after sending data on the channel in working mode 2, the receiving point is switched back to working mode 1 at once to send the acknowledgement of the sending of the data after a specified SIFS.

Fourth Embodiment

Figure 6:
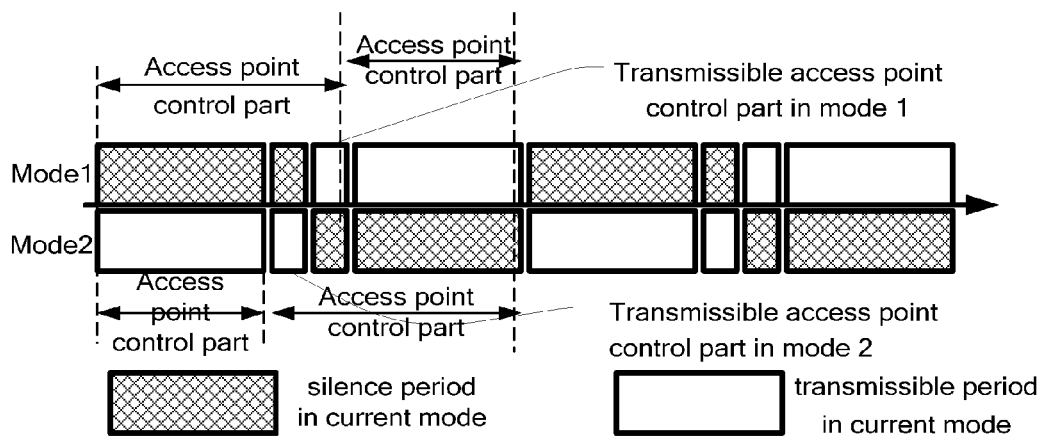
FIG. 6 is a diagram showing a mode switching process in the fourth embodiment of the disclosure.

FIG. 6 is a diagram showing a channel switching process in the embodiment, and the application scenario of the embodiment is that an AP works in the first and second working modes periodically and alternatively, the control information sent in each working mode is relatively independent, and the AP is switched between the first and second working modes periodically. In the embodiment, the AP supports the first and second working modes, and the non-AP supports the first and second working modes or only supports the first working mode. The switching process is as follows:

Step 1: The AP sends a system configuration message in the two working modes respectively and independently, and indicates the time division for the MAC in each mode respectively, for example, dividing the medium first working mode and into an AP control part and a point competition part in the second working mode in term of time respectively. The two working modes are aligned in time, but their time divisions are crossed, for example, the AP control part in the first working mode completely includes the point competition part in the second working mode in time, and the second working mode has the similar condition. In addition, the AP control part in each working mode is further divided into a current mode silence period and a current mode transmissible period. The current mode transmissible period of the AP control part in the first working mode is used for the non-competitive sending in the first working mode and the current mode silence period of the AP control part in the first working mode is used for the non-competitive and competitive sending in the second working mode, and the second working mode has the similar condition, as shown in FIG. 5.

Step 2: The AP sends a system configuration message, such as a beacon message, to indicate the configuration for the time of the MAC when the AP works in the first working mode.

Step 3: The AP sends a system configuration message, such as a beacon message, to indicate the configuration for the time of the MAC when the AP works in the second working mode.

Step 4: The non-AP can support the first or second working mode, interacts with the AP at the point competition part and accesses a network on the channel corresponding to the first or second working channel according to the time zone which is divided for the MAC in each working mode and indicated by the system configuration message that is broadcast in the first or second working mode, and the non-AP further transmits data in a corresponding working mode.

Fifth Embodiment

The embodiment describes that an AP notifies its working mode to a non-AP associated with the AP by a message or a frame exchange sequence explicitly or implicitly during the mode switching in the embodiment above; the message (such as a system configuration message) includes one or more of the following: working mode indication, channel indication, bandwidth indication, national area code indication and channel planning indication; and the frame exchange sequence includes the sending of one or more wireless frames and the sending of these wireless frame is used for indicating the subsequent working mode.

For example, when the country code in the current frequency planning area indicates China, the combinations are as follows:

(1) when the channel planning supported currently includes channels in the first channelized set, the operation supporting the first working mode is indicated;

(2) when the channel planning supported currently includes channels in the second channelized set, the operation supporting the second working mode is indicated; and (3) when the channel planning supported currently includes channels in the first and second channelized sets, the operation supporting the first and second working modes and the mode switching therebetween are indicated.

See a possible definition of frequency planning identification numbers shown in Table 1. The item of start frequency of 5 GHz belongs to the first channelized set, and the item of other start frequencies belongs to the second channelized set.

TABLE 1

Channel planning identification number

| Channel planning identification number | Start frequency (GHz) | Channel spacing (MHz) | Channel set |
| --- | --- | --- | --- |
| 1 | 5 | 20 | 149, 153, 157, 161, 165 |
| 2 | 5 | 40 | 149, 157 |
| 3 | 5 | 80 | 149 |
| 4 | 4737.5 | 20 | 200, 204, 208, 212, 216, 220 |
| 5 | 4737.5 | 40 | 200, 208, 216 |
| 6 | 4737.5 | 80 | 200, |
| 7 | 4737.5 | 120 | 200 |

The channel number indicated by the channel planning identification number is the channel serial number corresponding to the channel with the lowest center frequency in the channels of 20 MHz in the channel bandwidth.

See another possible definition of frequency planning identification numbers shown in Table 2.

TABLE 2

Channel planning identification number

| Channel planning identification number | Start frequency (GHz) | Channel space (MHz) | Channel set |
| --- | --- | --- | --- |
| 1 | 5 | 20 | 149, 153, 157, 161, 165 |
| 2 | 5 | 40 | 149, 157 |
| 3 | 5 | 80 | 149 |
| 4 | 4992.5 | 20 | 149, 153, 157, 161, 165, 169 |
| 5 | 4992.5 | 40 | 149, 157, 165 |
| 6 | 4992.5 | 80 | 149 |
| 7 | 4992.5 | 120 | 149 |

The above are only preferred embodiments of the disclosure and not intended to limit the disclosure. For those skilled in the art, various modifications and changes can be made in the disclosure. Any modifications, equivalent replacements, improvements and the like within the spirit and principle of the disclosure shall fall within the scope of protection of the disclosure.

INDUSTRIAL APPLICABILITY

The wireless point in the disclosure can be switched between each working mode when various compatible modes based on different channelized sets exist in a broadband wireless network, thereby setting up a broadband wireless network supporting backward compatibility.

The invention claimed is:

1. A method for mode switching for a backward compatible broadband wireless network, comprising:
indicating, by an Access Point (AP), its own current working mode to an associated non-AP by a system configuration message;
instructing, by the AP, the non-AP associated with the AP to switch a working mode by a frame exchange sequence;
switching, by the non-AP, the working mode according to instruction information included in the frame exchange sequence after the non-AP receives the frame exchange sequence;
after transmission is completed by the AP or by both the AP and the non-AP in another working mode that the working mode is switched to, switching the AP and the non-AP back to the working mode;
wherein the working mode refers to that the frame exchange sequence is transmitted by a channel defined by one or more channelized sets and a corresponding bandwidth; and the frame exchange sequence refers to the sending of a series of wireless frames and corresponding wireless frame feedback required to complete one data transmission.

2. The method according to claim 1, wherein the method is specifically implemented as follows:
instructing, by the AP in working mode 1, the non-AP associated with the AP by the frame exchange sequence that data will be sent in working mode 2 subsequently and notifying by the frame exchange sequence a maximum duration for sending data in the working mode 2 to the non-AP associated with the AP;
switching the AP and the non-AP to the working mode 2 to transmit data within a specified time according to the instruction after triggering of the frame exchange sequence for mode switching is completed; and
switching the AP and the non-AP back to the working mode 1 at once after data transmission is completed in the working mode 2;
the working mode 1 being a first or second working mode, and correspondingly, the working mode 2 being the second or the first working mode.

3. The method according to claim 1, wherein the method is specifically implemented as follows:
instructing, by the non-AP in working mode 1, the AP through the frame exchange sequence that data will be sent in working mode 2 subsequently and notifying through the frame exchange sequence a maximum duration for sending data in the working mode 2 to the AP;
switching the non-AP and the AP to the working mode 2 to transmit data within a specified time according to the instruction after triggering of the frame exchange sequence for mode switching is completed; and
switching the non-AP and the AP back to the working mode 1 at once after data transmission is completed in the working mode 2.

4. The method according to claim 1, wherein a process of instructing by the AP the non-AP associated with the AP to switch the working mode comprises:
sending, by the AP, the system configuration message in first and second working modes independently and respectively, and further indicating time division for Medium Access Control (MAC) in each working mode respectively; and
interacting, by the non-AP, with the AP at a point competition part and accessing a network on a channel corresponding to the first or second working mode according to a time zone which is divided for the MAC in each working mode and indicated by the system configuration message that is broadcast in the first or second working mode, and further transmitting, by the non-AP, data in a corresponding working mode.

5. The method according to claim 1, wherein the non-AP keeps silence in its original working mode when not supporting the another working mode.

6. The method according to claim 1, wherein
the system configuration message indicating the current working mode of the AP comprises one or more of the following: working mode indication, channel indication, bandwidth indication, national area code indication and channel planning indication.

7. A system for mode switching for a backward compatible broadband wireless network, comprising:
an Access Point (AP), which is configured to indicate its current working mode to a non-AP associated with the AP by a system configuration message, and further configured to instruct the non-AP associated with the AP by a frame exchange sequence to switch a working mode, and then configured to be switched back to the working mode after transmission is completed in another working mode that the working mode is switched to; and
the non-AP, which is configured to switch the working mode according to instruction information included in the frame exchange sequence after receiving the frame exchange sequence, and further configured to be switched back to the working mode after transmission is completed in another working mode that the working mode is switched to;
wherein the working mode refers to that the frame exchange sequence is transmitted by a channel defined by one or more channelized sets and a corresponding bandwidth; and the frame exchange sequence refers to the sending of a series of wireless frames and corresponding wireless frame feedback required to complete one data transmission.

8. The system according to claim 7, wherein
the AP in working mode 1 instructs the non-AP associated with the AP through the frame exchange sequence that data will be sent in working mode 2 subsequently and notifies through the frame exchange sequence a maximum duration for sending data in the working mode 2 to the non-AP associated with the AP;
the AP and the non-AP are switched to the working mode 2 to transmit data within a specified time according to the instruction after completing triggering the frame exchange sequence for mode switching; and the AP and the non-AP are switched back to the working mode 1 at once after completing data transmission in the working mode 2;
the working mode 1 being a first or second working mode, and correspondingly, the working mode 2 being the second or the first working mode.

9. The system according to claim 8, wherein the first working mode is a working mode in which the AP works on a channel in a first channelized set; and the second working mode is a working mode in which the AP works on a channel in a second channelized set.

10. The system according to claim 7, wherein
the non-AP is further configured to instruct the AP through the frame exchange sequence in working mode 1 that data will be sent in working mode 2 subsequently and notify through the frame exchange sequence a maximum duration for sending data in the working mode 2 to the AP;
the non-AP and the AP are switched to the working mode 2 to transmit data within a specified time according to the instruction after completing triggering the frame exchange sequence for mode switching; and
the non-AP and the AP are switch back to the working mode 1 at once after completing data transmission in the working mode 2.

11. The system according to claim 7, wherein
the AP sends the system configuration message in first and second working modes independently and respectively, and indicate time division for Medium Access Control (MAC) in each working mode respectively; and
the non-AP interacts with the AP at a point competition part and accesses a network on a channel corresponding to the first or second working mode according to a time zone which is divided for the MAC in each working mode and indicated by the system configuration message broadcast in the first or second working mode, and further transmits data in a corresponding working mode.

12. The system according to claim 10, wherein the first working mode is a working mode in which the AP works on a channel in a first channelized set; and the second working mode is a working mode in which the AP works on a channel in a second channelized set.

13. The system according to claim 7, wherein the system configuration message indicating the current working mode comprises one or more of the following: working mode indication, channel indication, bandwidth indication, national area code indication and channel planning indication.

* * * * *